Patented May 11, 1926.

1,584,579

UNITED STATES PATENT OFFICE.

RUDOLPH J. WIG, OF LOS ANGELES, CALIFORNIA, ASSIGNOR TO THE CELITE COMPANY, OF LOS ANGELES, CALIFORNIA, A CORPORATION OF DELAWARE.

MATERIAL FOR USE IN CEMENT COMPOSITIONS.

No Drawing. Application filed March 20, 1926. Serial No. 96,304.

My invention relates to a definite product for use in cement compositions or as an admixture to cement to develop certain desirable physical characteristics. Such product, the methods of using such product, and the results obtained thereby are described in the following specification.

This application is a continuation in part of my application filed May 26, 1925, Serial No. 33,043, for which this application is a substitute.

The object of this invention is to provide a finely divided material obtained from diatomaceous earth, such material being added in small quantities to cement or cement compositions to give greater workability and strength, and more homogeneous structure, than such cement might otherwise develop. It is intended that the term "cement" as used herein be taken to mean and include any cement, such as Portland cement, ferrogeneous cement, or any hydraulic cement used in combination with or without other materials in the making of concrete, plaster, stucco, etc. Furthermore, it is intended that the term "plastic materials" as used herein be construed throughout the specification to mean and include all such plastic materials as are made by the combination of any hydraulic cement, with sand, gravel, rock, or other similar aggregate to produce concrete, plaster, stucco, etc. The particular examples cited in this specification will refer to the use of my product with Portland cement, sand, and rock, although my invention is not limited to such use.

The use of diatomaceous earth (otherwise known as kieselguhr, tripoli, molar, fossil flour, infusorial earth, etc.) in cement or cement compositions has been known in a general way for some time, but such use has never been commercially or successfully applied; practically all of the known data refers to experimental results. This condition is primarily due to the variable results obtained, and the lack of actual knowledge as to the properties of diatomaceous earth used in such experimental work.

I have found that the successful use of diatomaceous earth in cement compositions depends upon the fineness or particle size of the diatomaceous earth, and on the quantities of this material which are used. I find that diatomaceous earth must be finely ground or disintegrated, and furthermore that such disintegration must fall within fairly well defined limits. My invention discloses and states the particular limits for the fineness to which the diatomaceous earth must be disintegrated.

No one, to my knowledge, has shown what "grade" or fineness of diatomaceous earth is best adapted to the purposes of my invention and the fact that the fineness of the diatomaceous earth varies the results obtained by its use in cement has not been disclosed in the prior art. For example, my work has shown that coarsely ground diatomaceous earth (a material containing particles the size of a pea, for example) produces a weak cement or concrete, while a diatomaceous earth reduced to a state of ultimate division of the particles (for example, composed entirely of particles less than 0.001 mm. in size) does not give results which I deem favorable. A diatomaceous earth product made in accordance with my invention should contain not more than 25% (by weight of the total amount) of particles having a greater average size than 0.02 mm. square. These limits may be varied to a certain extent depending upon the methods used in determining the size of the particles, but at no time should more than approximately 3% be left on a 30 mesh screen, nor is it desirable to have more than 70% of the material finer than 0.001 mm. square. Sedimentation methods may be used to determine the particle size, but microscopic methods may also be used. Wherever a certain particle size is mentioned, for example, 0.02 mm. square, I mean to include all particles, both isotropic and anisotropic, which it would be reasonable to assume would pass or be retained (as the case may be) on a screen having such opening. When sedimentation methods of determining particle size are used, I distinguish 0.02 mm. particles as those acting under Stokes' law as spherical particles of approximately 0.02 mm. in diameter.

The following particle size analyses represent fairly well the grades of diatomaceous earth which I have developed and found most effective for use in cement compositions:

| Size of particles | No. 1 | No. 2 | No. 3 |
|---|---|---|---|
| | Per cent | Per cent | Per cent |
| Greater than 20 microns | 23 | 17 | 0 |
| 10 to 20 microns | 10 | 7 | 7 |
| 5 to 10 microns | 13 | 15 | 8 |
| 1 to 5 microns | 34 | 21 | 15 |
| Less than 1 micron | 20 | 40 | 70 |

The exceedingly fine particle size of the materials tabulated above may be appreciated by considering that 1 micron is equivalent to 0.001 millimeter. In other words, a particle of 20 microns in diameter is only 0.00078 inches in diameter, or a particle which would be approximately 650 mesh. It is to be remembered that diatomaceous earth is composed of microscopically small siliceous particles and may be disintegrated to exceeding fineness, while sand, quartz, or other forms of silica cannot be readily reduced to such fine state of division because of their structural strength and crystalline formation. My invention therefore consists in the production of a finely disintegrated diatomaceous earth product of certain definite particle size, such material giving results, in cement compositions, hitherto unattained.

The above specifications for disintegrated diatomaceous earth for use in cement compositions were developed after numerous experiments and practical applications, and although the theory underlying the particular effectiveness of the product is not entirely clear, it may be similar to that which underlies the classification of aggregates for concrete. I do not wish to limit myself to any theory, but rely primarily on the facts disclosed during my investigation. For example, if appreciably more than 25% of the disintegrated diatomaceous earth is larger than 0.02 mm. square in size, the product is not quite as effective as a material falling within the above described limits. The reason for the above action may lie in the fact that diatomaceous earth alone has relativly no strength and the coarse particles do not act as a structural material, for example, sand; that is, they do not impart strength to the cement compositions. Similarly, a material containing more than approximately 70% of particles 0.001 mm. square and finer does not produce the workability in cement compositions which is characteristic of the compositions made with diatomaceous earth disintegrated to the extent specified by me.

A diatomaceous product in accordance with the above specifications may be easily manufactured by disintegrating raw or natural diatomaceous earth by means of suitable apparatus and then classifying the disintegrated material to get a product of the required particle size. This classification is most readily accomplished in air separating apparatus, or conical chambers, through which the disintegrated material is carried by means of a vehicle such as air or gas. The heavier and consequently larger particles are left in such chambers, while the finer particles are carried on until finally they are removed in other suitable chambers. My invention pertains to the product made and not to the method of manufacture, however, and is not to be limited to the method or apparatus used in such manufacture.

I have found that a very effective product may also be obtained by calcining or heating the diatomaceous earth either before or after disintegration, the latter process, that is, calcination after disintegration, or partial disintegration, being preferable. This calcination removes a certain amount of organic matter which may or may not be present (depending upon the purity of the diatomaceous earth in its natural state), and otherwise changes the physical characteristics of the material, but should not be carried to such extent as to affect the serviceability of such calcined diatomaceous earth for use in cement compositions.

In using my specially prepared and classified diatomaceous earth product in cement compositions, I prefer to add to such composition from approximately ½% to about 10% of my product by weight of the cement with which it is to be used. For example, in a 1:2½:5 concrete I have found it desirable to use from approximately 2% to 6% of my disintegrated diatomaceous earth by weight of the Portland cement used to such concrete mixture. The effect of using such diatomaceous earth product in cement compositions, for example, Portland cement, seems to be the thickening of the vehicle (water) which carries the aggregate and sand, thus tending to maintain the homogeneity, plasticity and consequently the better working quality of the concrete as a whole. When used in quantities not exceeding about 10%, the strength of the cement mixture is generally increased and the workability or the ease with which the concrete may be poured, rammed, or otherwise placed in position, is greatly enhanced inasmuch as the diatomaceous earth product appears to have a lubricating effect. There is less settling of the aggregate; rock pockets, or segregation of the aggregate does not occur, and the concrete becomes more impervious by reason of the fact that the size of the voids is decreased. The reduction in size of voids gives a less permeable concrete which withstands the action of sea waters very successfully.

The effect of using my disintegrated diatomaceous earth product in concrete may be seen from the following results:

*1:3:6 concrete*

| Percentage of diatomaceous earth | Crushing strength (28 days) | Workability |
|---|---|---|
| 0 per cent | 1,044 | 183 |
| 1.7 per cent | 1,155 | 162 |
| 3.3 per cent | 1,129 | 144 |
| 5.0 per cent | 1,002 | 84 |
| 10.0 per cent | 936 | 53 |
| 15.0 per cent | 778 | 30 |

It will be seen that in the above tests the maximum strength was developed with 1.7% of my product and it represented an increase of 10.6% in strength. The workability given under the third column shows an arbitrary figure which is representative of the ease with which the concrete can be rodded or placed, an increase in the ease with which concrete may be worked being shown by a reduction of the workability figure. Although the above results indicate that 1.7% of my product develops greatest strength in the 1:3:6 concrete, cited as an example, the effect may be varied by the grade of Portland cement used, amount of water, size and fineness modulus of the aggregate, etc., so that I do not wish to be limited to any definite amount of my product in such concrete or in other concrete mixtures other than that such addition does not exceed about 10% on weight of the cement used. The addition of my classified diatomaceous earth may be made either to the cement at its place of manufacture, or to the cement immediately before or during its mixture with water, sand, rock, and any or all other ingredients, preparatory to the use of such cement or cement composition on a job.

It is commonly accepted that an increase in the amount of water used in mixing a cement composition, say 1:2:4 concrete, reduces the strength of the concrete. This, I have found, is not altogether true when a diatomaceous product such as I have described, is used. For example, a 1:2:4 concrete without my product was mixed using 9.68% water on weight of aggregate and cement, and showed a workability of 386, and a flow (as determined in accordance with A. S. T. M. methods) of 90. The crushing strength in 28 days was 1885 lbs. per square inch. When to another batch of the same concrete I added 2% by weight of cement of my diatomaceous product, and used 10.01% water on weight of cement and aggregate, the flow was only 80, but the workability was increased to 231, and the crushing strength to 2088 lbs. per square inch. In general, therefore, it may be desirable to add to cement compositions containing my product only enough water to give a smaller flow than that of plain cement compositions. When slump is used as a criterion of consistency of concrete it may be said that generally no additional water should be added to concrete mixtures containing my product, in excess of that required to give the same slump as that of plain concrete.

The relative ineffectiveness of using a disintegrated diatomaceous earth containing more than approximately 70% by weight of particles 0.001 mm. square and finer may be seen from the following results by a 1:2:4 concrete using 2% of the diatomaceous earth on weight of Portland cement:

| Disintegrated diatomaceous earth, average particle size | Workability figure | Ratio of effectiveness |
|---|---|---|
| | | *Per cent* |
| No admixture | 169 | 100 |
| 20% smaller than 0.001 mm. square | 97 | 175 |
| 60% smaller than 0.001 mm. square | 123 | 136 |
| 85% smaller than 0.001 mm. square | 157 | 107 |

In addition to the increased workability which results from the use of my disintegrated diatomaceous earth in cement compositions, and which materially reduces the labor cost of placing such compositions, I find that my product produces an increased yield of such cement composition, such increase in yield generally exceeding what would be expected by mere addition of an inert material. For example, duplicate columns of 1:2½:3½ concrete were poured, 3½% disintegrated diatomaceous earth of the preferred particle size on weight of Portland cement being used in one and no diatomaceous earth in the other. After the columns were thoroughly set, they were carefully measured and it was found that the column in which my product was used had a volume of 5.3% greater than the plain cement.

These results have been checked on many structural operations with practically the same results, and show the benefit derived by the use of my material, such benefit being negligible when the diatomaceous earth contains more than approximately 70% of particles smaller than 0.001 mm. square, and greatly reduced when the diatomaceous earth contains more than approximately 25% of particles greater than 0.02 mm. square.

Actual structural concrete work has shown that the following percentages of my product generally give good results in the concrete mixes cited:

1:1½:3 concrete—1½—3% by weight of cement content.

1:2:4 concrete—2—4% by weight of cement content.

1:2½:5 concrete—2—6% by weight of cement content.

1:3:6 concrete—3—8% by weight of cement content.

What I claim is:—

1. A diatomaceous earth product for use in plastic compositions containing not more than approximately 25% by weight of particles larger than 0.02 mm. square and no more than approximately 70% by weight of particles smaller than 0.001 mm. square in size.

2. A finely divided diatomaceous earth product for use in cement compositions containing not less than approximately 75% by weight of particles smaller than 0.02 mm. square in size.

3. As an admixture to cement compositions, a finely disintegrated diatomaceous earth product comprising not more than approximately 3% by weight of particles left on a 30 mesh screen, and no more than approximately 70% by weight of particles smaller than 0.001 mm. square in size.

4. A plastic composition comprising hydraulic cement, sand, an aggregate, and finely divided diatomaceous earth containing not less than approximately 75% by weight of particles smaller than 0.02 mm. square in size; the amount of the diatomaceous earth used being approximately from 1% to 10% by weight of the cement used.

5. A plastic composition for the purpose specified comprising cement, sand, an aggregate, and a finely divided diatomaceous earth containing not more than approximately 25% by weight of particles about 0.02 mm. square or larger in size, and approximately 75% of particles smaller than 0.02 mm. square in size.

6. A plastic composition comprising cement, sand, an aggregate, and a finely divided diatomaceous earth containing not more than approximately 25% of particles about 0.02 mm. square or larger in size, and not more than approximately 70% of particles smaller than 0.001 mm. square in size; the amount of the diatomaceous earth used being from approximately 1% to 10% by weight of the cement used.

7. A plastic composition for the purpose specified comprising cement, a suitable aggregate, and a finely divided diatomaceous earth containing approximately 75% of particles smaller than 0.02 mm. square in size.

8. A plastic composition comprising hydraulic cement; sand; an aggregate; a finely divided diatomaceous product containing not more than approximately 25% of particles about 0.02 mm. square or larger in size, and not more than approximately 75% by weight of particles 0.02 mm. square or smaller in size; the amount of the diatomaceous product being approximately 1% to 10% by weight of the cement used; and water in such amount as to give the plastic composition a slump no greater than that of a plastic composition not containing the diatomaceous product.

In testimony that I claim the foregoing as my own, I affix my signature.

RUDOLPH J. WIG.